United States Patent Office 2,824,844
Patented Feb. 25, 1958

2,824,844

AMINATED ION EXCHANGE RESINS CONTAINING DIVINYL SUBSTITUTED HETEROCYCLIC COMONOMERS AS CROSS-LINKERS

Martin E. Gilwood, Oceanside, N. Y., assignor to Pfaudler Permutit Inc., a corporation of New York No Drawing. Application May 20, 1953
Serial No. 356,293

18 Claims. (Cl. 260—2.1)

The present invention relates to novel synthetic polymeric compositions and to novel anion exchange resins prepared therefrom which are useful in the removal of anions from aqueous solutions and to a novel method for preparing said novel anion exchange resins. The invention also relates to a method of removing anions from an aqueous solution.

Anion exchange resins, in order to be satisfactory for use, must be substantially insoluble in water, dilute acids and alkalies. They must be capable of resisting physical transformation, such as undue swelling, or mechanical disintegration, such as spalling or shattering of the resin beads and granules, when in contact with the solution they are used to treat. They must also have a high useful or operating capacity for removing anions from aqueous solutions, and be capable of being repeatedly regenerated for reuse when they become exhausted. It is also desirable that in addition to a high operating capacity, the resin have a high capacity for removing the weaker anions from solution, such as silica and carbon dioxide. The present invention makes it possible to obtain anion exchange resins which have a significant enhancement in operating capacity over that of the anion exchange resins with which the prior art is generally familiar.

It is an object of the present invention to provide novel anion exchange resins which, while possessing all of the essential properties of a successful anion exchange resin, possess an unusually high operating capacity as well as a high capacity for the removal of weaker anions from aqueous solutions.

It is also an object of the present invention to provide novel copolymer resins which may unto themselves have some anion exchange properties, and which may be converted to improved anion exchange resins.

It is a further object to provide a novel process for the removal of anions, and especially weaker anions, from aqueous solutions.

It is an additional object to provide a novel process for providing the novel anion exchange resins of the present invention.

Other objects will be apparent to those skilled in the art from a reading of the description which follows.

Basic anion exchange resins have been known to the ion exchange art for several years. These anion exchange resins are usually amine derivatives of an insoluble copolymer of a monovinyl aryl compound, such as styrene, and a polyvinyl aryl compound, such as divinyl benzene. The polyvinyl aryl compound serves as a cross-linker which imparts water insolubility to the copolymer resin. These cross-linker compounds, which usually comprise from 0.1% to as high as 40% of the copolymer resin on a molar basis. Since these cross-linker compounds originally contain no functional group which is, or may be converted to, an amine group, they contribute little or nothing to the anion exchange properties or capacities of the final anion exchange resins; they are largely inert and dead weight. I have discovered that as a result of the present invention, it is possible to have anion exchange resins in which the cross-linker compounds contribute their share to the anion exchange properties of final product. In fact, the functional group present in the cross-linker compound may be easily converted to the more highly basic quaternary ammonium group which is excellent for the removal of weakly acidic contaminants of aqueous solutions.

The present invention comprises novel, water-insoluble anion exchange resins comprising copolymer resins having present as the functional anion exchanging groups one or more amine groups which may be selected from the group consisting of primary, secondary, tertiary and quaternary ammonium groups. At least one of the amine groups shall be a tertiary amine or a quaternary ammonium group which is a component of the cross-linker compound. The copolymer resin comprises the polymerizate of a monovinyl aromatic compound, such as a monovinyl aromatic hydrocarbon or a monovinyl substituted ring-containing nitrogen heterocyclic compound on one hand and a divinyl substituted ring-containing nitrogen heterocyclic compound as the cross-linker compound. Where the anion exchange resin is to be used for adsorbing weaker anions such as the carbonate ion or silicic acid, it is preferred that as many quaternary ammonium ions be present in the anion exchange resin as possible. Where the anion exchange resin is to be used for adsorbing the stronger anions such as the mineral acid anions, a larger proportion of less substituted amines substituents may be used, such as the primary, secondary and tertiary amine groups.

The novel copolymer resins which comprise an important feature of the present invention are prepared by copolymerizing a monovinyl aromatic compound, such as a monovinyl aromatic hydrocarbon or a monovinyl substituted ring-containing nitrogen heterocyclic compound with a divinyl substituted ring-containing nitrogen heterocyclic compound. The monovinyl aromatic hydrocarbons include styrene, ortho-, meta-, and para-methyl and ethyl styrenes, vinyl naphthalene, vinyl anthacene and homologs of these compounds. Styrene is preferred.

The preferred monovinyl substituted, ring-containing nitrogen heterocyclic compounds contemplated for use in the copolymer resins of the invention are those of the alkyl pyridines and desirably a methyl, vinyl pyridine, and 2-methyl-5 vinyl pyridine in particular. Other vinyl alkyl pyridines which are satisfactory are 2-ethyl-5-vinylpyridine, 3-methyl-5-vinylpyridine, 2,3-dimethyl-5-vinylpyridine and 2-methyl-3-ethyl-5 vinylpyridine. The nature of the substituents, other than the vinyl group, substituted on the pyridine ring may be varied in accordance with the physical properties of the resulting resin, the number of amine groups desired for anion exchange and the commercial availability of the vinyl substituted, ring-containing nitrogen compounds. However, other vinyl substituted, ring-containing nitrogen heterocyclic compounds may be used, such as the alkyl substituted, and preferably the methyl substituted, vinyl-pyrroles, pyrimidines, pyridazines, quinolines and isoquinolines. Some of the compounds of these latter classes are the vinyl methyl quinolines, such as 2-methyl-5 vinyl quinoline, 4-methyl-4-vinyl quinoline, the isoquinolines, such as 1-methyl- or 3-methyl-5-vinyl isoquinoline.

In addition to the vinyl, alkyl, ring-containing nitrogen hetero-cyclic compounds described above, other compounds which have an active hydrogen substituent may be used. In the case of the vinyl, alkyl, ring-containing nitrogen heterocyclic compounds, the nitrogen in the heterocyclic ring tends to activate one or more of the hydrogen atoms in the alkyl side chain. Such a copolymer resin with an active hydrogen substituent, also permits the formation of amine derivatives which provide excellent anion exchanging groups. However, other compounds may be used which have an active hydrogen substituent, such as compounds having an additional substituent on the cyclic nucleus which activates the ring. Among such compounds are those activated by a hydroxyl group to produce a vinyl substituted phenol, a hydroquinone group; to produce vinyl substituted benzohydroquinones or naphthohydroquinones; such compounds as vinyl cyclohexanone, vinyl cyclopentanone, vinyl antipyrine, vinyl methyl thiophene and vinyl methyl furan. In these compounds the hydroxyl group activates the phenol ring, the hydroquinone group activates the ring of benzohydroquinone and naphthohydroquinone compounds, the ketone group activates the cyclohexane and cyclopentane rings and the sulfur and oxygen atoms in the heterocyclic nuclei activate the heterocyclic nuclei of thiophene and furan.

The other component of the novel copolymer resins of the invention is a divinyl substituted, ring-containing nitrogen heterocyclic cross-linker compound. These compounds are the divinyl pyridines or divinyl, alkyl-substituted pyridines and other divinyl substituted derivatives of such nitrogen-containing heterocyclic compounds as quinoline, isoquinoline, pyrrole, etc. Based upon results obtained thus far the divinyl pyridines and divinyl alkyl pyridines, such as the divinyl methyl pyridines, are preferred. The divinyl pyridines are occasionally obtained as mixtures of the isomers in which the two vinyl groups may be ortho, meta and para substituted with respect to each other. Isomers may be present in the divinyl pyridines in some instances where the product has been prepared from starting materials containing mixtures of isomers, such as the polymethyl pyridines. Because these mixtures of special isomers provide satisfactory cross-linkers, it is usually not necessary to separate and isolate the various isomers.

As may be observed from the structural formula below:

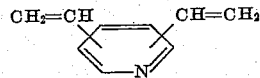

which depicts an example of a divinyl pyridine species of the divinyl, ring-containing nitrogen heterocyclic cross-linkers of the copolymer resins of the invention, there is a tertiary amine group present within the pyridine ring. This tertiary amine group is capable of absorbing anions and when the copolymer resin is treated with a quaternizing agent, the tertiary amine is converted to the quaternary ammonium group which, because of its highly basic properties, is excellent for removing weak anions from an aqueous solution. Thus in the copolymer resins of the present invention the divinyl, ring-containing nitrogen-heterocyclic cross-linker contributes its share of anion adsorbing capacity to the final anion exchange resins of the invention.

The basic copolymer resins of the invention containing the divinyl ring-containing nitrogen heterocyclic cross-linker, which have been described above, may be prepared by copolymerizing a monovinyl aromatic compound, of the various types described above, with the crosslinker. The copolymer resin shall contain a predominant amount on a molar basis, of the monovinyl aryl compound or, stated in another way, more than half of the total number of moles of reactants in preparing the copolymer shall be of monovinyl aryl compounds. It is preferred that the monovinyl aromatic compound constitute from 60 to 99.9%, on a molar basis, of the copolymer. Therefore, the cross-linker compounds should constitute from 0.1 to 40% of the mixture on a molar basis. Increased amounts of cross-linking compounds produce a copolymer which is increasingly dense and which becomes correspondingly difficult to halo-alkylate in subsequent steps. Best results are obtained where the monovinyl aromatic moiety constitutes from about 80.0 to 99.5% of the copolymer resin and the cross-linker from 0.5 to 20% (both on a weight basis). It is the prevailing practice on the part of anion exchange producers, in making the anion exchange resins of the prior art, to prepare first a copolymer resin containing 4 to 10% by weight of cross-linker. Due to the unique properties obtained with the cross-linkers of the present invention, I find that I can advantageously incorporate from 7 to 20% by weight of cross-linker into the copolymer resin. A polymerizate or copolymer resin having a particle size range of between 15 to 60 mesh is most desirable.

The polymerization of the copolymer resin for use in the invention is conducted in the presence of well known oxidizing catalysts. These catalysts include ozone, oxygen, organic peroxides, such as acetyl peroxide, tertiary-butyl hydroperoxide, benzoyl peroxide, hydrogen peroxide, the so-called "per" salts, such as the water soluble persulfates, and the azoketonitriles, such as azobisisobutyronitrile and azobiscyclopropriopropylnitrile. The catalyst may be employed in suitable amounts ranging from 0.1% to about 2.0% by weight based upon the weight of monomeric material to be polymerized.

The copolymer resins described above may then desirably be converted to an anion exchange resin having optimum anion exchange capacity. In the case of copolymer resins of a monovinyl aromatic hydrocarbon and a divinyl, ring-containing nitrogen heterocyclic cross-linker, the nuclear substitution of an aminoalkyl group is desirably provided by haloalkylation of the copolymer resin, followed by amination and preferably by quaternization. The haloalklation step involves introducing into the copolymer a plurality of bromoalkyl or preferably chloroalkyl groups. This entails the substitution onto the aromatic nuclei of the copolymer resin, groups having the general formula:

$$-C_nH_{2n}-X$$

Wherein X is chlorine or bromine and $n$ is an integer from 1 to 4. While it is contemplated that $n$ may contain from 1 to 4 carbon atoms, it is preferred to employ those compounds having chloromethyl groups substituted to the insoluble copolymer resin because these products are the most reactive. The carbon atoms in the haloalkyl group may be in a straight or a branched chain. The preferred method of haloalkylation is by reacting the insoluble copolymer resin with a haloether or a mixture of an alkyl halide and a halogen acid and a Friedel-Crafts catalyst, such as aluminum chloride, zinc chloride, stannic chloride, etc. One may also haloalkylate by reacting the copolymer resin with an aldehyde and a halogen acid (e. g., paraformaldehyde and hydrochloric acid). Alternately, one may use a dihaloalkane and a Friedel-Crafts catalyst (e. g., ethylene dichloride and aluminum chloride). Methods of chloroalkylating are described in "Organic Reactions," vol. 1, chapter 3, page 63 et seq. (1942). It is desirable to have several haloalkyl groups for each aromatic nucleus, for each is capable of conversion to an amine group and the greater the number of these, the greater will be the capacity of the anion exchange resin.

In the event that the copolymer resin has been prepared from alkyl substituted monovinyl aromatic compounds such as the methyl styrenes and methyl vinyl pyridines, it is possible to prepare the haloalkyl derivative of the copolymer resin by direct chlorination or bromination of the alkyl substituent on the aromatic ring. If there is more than a single alkyl group for each aromatic nucleus, a corresponding number of haloalkyl groups will be formed. The chlorination and bromination of copolymer resins prepared from alkyl substituted, monovinyl ring-containing nitrogen heterocyclic compounds with a divinyl aromatic hydrocarbon or an unsaturated aliphatic cross-linker to produce the chloro- or bromoalkyl derivative is described in the pending application of Albert H. Greer, Serial No. 304,009. The halogenation with elemental chlorine and bromine is preferably conducted in an inert, non-aqueous solvent, such as carbon tetrachloride or glacial acetic acid. The halogenation is desirably conducted under exposure to ultra-violet radiation.

It is believed apparent to those skilled in the art that the copolymer resins of the invention have now been converted to nuclear substituted haloalkyl derivatives of the copolymer resins. These haloalkyl derivatives may next be converted to the amine derivatives of the haloalkylated copolymer resins by amination. The type of amine derivative obtained is determined by the class of amine used. For example, if ammonia is used, a primary amine derivative is obtained. If a primary amine is used, a secondary amine derivative is obtained. A secondary amine and a tertiary amine will produce a tertiary amine and quaternary ammonium derivative, respectively. The quaternary ammonium derivatives are preferred where a highly basic anion exchange resin is desired, for these resins are excellent for removing weakly acid anions such as silica and carbonate.

Among the primary amines which are satisfactory aminating agents are the lower alkyl, aralkyl and alkanol amines such as: methyl amine, monoethanolamine, ethylamine, butyl amine and benzyl amine. The polyalkylene polyamines produce particularly high operating capacity anion exchange resins and among these are: diethylene triamine, triethylene tetramine, tetraethylene pentamine, etc.

Among the secondary amines which may be used for amination are the lower dialkyl amines, such as dimethylamine, diethylamine, dipropylamine and di-n-butylamine; the lower alkanol amines such as methyl-ethanol-amine, ethyl-ethanolamine, and diethanolamine; the aralkylamines such as dibenzylamine, methylbenzylamine; and the cyclic amines such as piperazine, piperidine and morpholine. Of this group, dimethylamine is preferred.

Among the tertiary amines which may be used for amination are amines containing alkyl, aralkyl and alkanol groups. Suitable tertiary amines are typified by the following: trimethyl-, triethyl- and tripropylamines, benzyl-dimethylamine, dimethylethanolamine, methyldiethanolamine, and the like. Trimethylamine and dimethyl-ethanolamine are preferred.

If the amination is conducted on a haloalkylated copolymer resin produced from a monovinyl aromatic hydrocarbon, such as styrene, using the preferred tertiary amines, the aromatic hydrocarbon nuclei will contain the following quarternary ammonium alkyl substitutents:

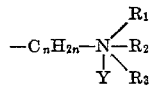

in which $R_1$, $R_2$, and $R_3$ are alkyl, alkanol and aralkyl groups and are of the "lower" category, i. e., each having 8 or less carbon atoms, and in the case of alkyl and alkanol groups, preferably not more than 4 carbon atoms each. $n$ is an integer of from 1 to 4. Best results are obtained where $n$ is one and the —$C_nH_{2n}$— group is a methylene group. Y is an anion; preferably one of a mineral acid, such as chloride, bromide, sulfate, etc., or when in the anion exchanging condition, is a hydroxyl group. The quaternary ammonium anion exchange resins of the invention have excellent properties for adsorbing weak anions when one or both of $R_1$ and $R_2$ are lower alkanol groups, particularly where one or both of these groups is the ethanol group.

When the amination is conducted upon a haloalkylated copolymer resin produced from a monovinyl, alkyl substituted, ring-containing nitrogen heterocyclic compound, using the preferred tertiary amines, the nuclei of the monovinyl aromatic moiety becomes substituted with quaternary ammonium alkyl substituents. If a quantity of amine in excess of a molar equivalent is used in the amination, there will be one amino-alkyl substituent produced for each haloalkyl group in the copolymer resin.

When a chloroalkyl derivative of a copolymer resin prepared from 2-methyl-5-vinyl pyridine in accordance with the process of the invention is aminated with a tertiary amine, the 2-methyl-5-vinyl pyridine moiety of the resulting anion exchange resin has the following structure:

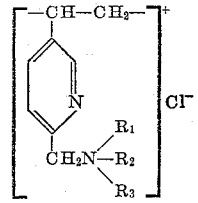

Since the nitrogen of the pyridine ring of the ring-containing nitrogen heterocyclic constituent is a tertiary nitrogen atom which is somewhat basic in nature, it imparts additional anion exchange capacity to the resulting anion exchange resin. The anion exchange properties of the resin may be enhanced by converting this ring nitrogen to a pentavalent nitrogen atom by quaternizing this tertiary nitrogen atom with a quaternizing agent. The quaternization step may be effected either before or after the amination step. If the quaternization step is carried out after the amination of the haloalkyl groups, the amino-alkyl groups substituted on the heterocyclic nuclei will tend to be converted to quaternary ammonium alkyl groups if the amino group is not already completely substituted. That is to say, primary, secondary or tertiary amino alkyl groups will become further substituted with the organic component of the quaternizing agent to increase the degree of substitution of the amine group. If sufficient quaternizing agent is used in this step, the amine groups will all be converted to quaternary ammonium groups. Because of the greater expense usually associated with quaternizing agents, it is preferable that in the amination one utilizes the less expensive tertiary amines, so that the more expensive quaternizing agents will not be dissipated on the aminoalkyl group.

The quaternizing agents are a well known group of organic chemicals. Among this well known group of chemical reagents are the alkyl halides, such as methyl chloride, bromide and iodide, ethyl chloride, bromide and iodide, etc.; dialkyl sulfates, such as dimethyl, diethyl, dipropyl, dibutyl sulfates; aralkyl halides and sulfates such as benzyl chloride and sulfate; epihalohydrins, such as epichlorohydrin; and alkyl esters of aryl sulfonates, such as methyl toluene sulfonate and methyl benzene sulfonate. Quaternization of the tertiary and less substituted amine groups is preferably carried out in either a non-aqueous solvent, such as methanol, or an aqueous solvent.

The divinyl nitrogen containing heterocyclic crosslinking compounds used in preparing the copolymer resins of the invention, because of the nitrogen contained in the heterocyclic nucleus, also impart, as aforementioned, anion exchange capacity to the final anion exchange resins. These nitrogen atoms, which are usually tertiary amine groups, may easily be converted to more basic amine groups by quaternizing the nuclear nitrogen with a quaternizing agent. The more basic quaternary ammonium nitrogen which is formed has a greater affinity for the weaker anions. The quaternization may be accomplished in the same manner as described above. Where the crosslinker compound is a divinyl pyridine, and the quaternization is effected with methyl chloride, the crosslinker moiety of the copolymer resin will have the following structure.

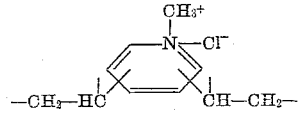

In the case of copolymer resins prepared from a vinyl aromatic compound having an active hydrogen substituent which is activated by an activating substituent substituted on or part of the aromatic nuclei, an alternate process is available for producing nuclei substituted aminoalkyl derivatives of the copolymer resins of the invention. The process is described in the copending application of Albert H. Greer, Serial No. 345,680 with respect to novel anion exchange resins prepared from copolymer resins of vinyl substituted, cyclic compounds containing an active hydrogen substituent, and having a ring activating substituent, crosslinked with a polyvinyl aromatic hydrocarbon or certain unsaturated aliphatic compounds. This alternate process comprises condensing the copolymer resin of the vinyl substituted aromatic compound having a ring activating substituent crosslinked by a divinyl, ring-containing nitrogen heterocyclic compound, with an aldehyde containing not more than 3 carbon atoms, preferably a commercially available form of formaldehyde, and with ammonia, a primary or a secondary amine of the type described above. The resulting product may then be quaternized to convert all of the amine groups to quaternary ammonium groups. The process of quaternizing described above is used. For use in this alternate process, it is contemplated that where the monovinyl aryl moiety of the copolymer resin is a monovinyl, alkyl substituted, ring-containing nitrogen hetteocyclic compound, there may be used such compounds as the vinyl alkyl pyridines, in which the alkyl group is substituted in the 2, 4 or 6 positions, including 2-methyl-5-vinyl pyridine, 4-methyl-5-vinyl pyridine and 2,4-dimethyl-5 vinyl pyridine, vinyl methyl quinolines, such as 2-methyl-5-vinyl quinoline, the isoquinolines, such as 1-methyl- or 3-methyl-5-vinyl isoquinoline.

As an example of this alternative process, a copolymer resin of 2-methyl-5-vinylpyridine crosslinked by a divinyl pyridine is condensed with formaldehyde and dimethylamine, or acid-addition salts of the dimethyl amine, to produce the dimethyl-aminoethyl nuclear substituted derivative of the copolymer resin. This tertiary amino-alkyl group and the tertiary nitrogen of the pyridine nuclei are both finally quaternized by treatment with a quaternizing agent.

For purposes of anion exchange, it is necessary to first convert the quaternary ammonium salt groups which are present in the anion exchange resins of the invention to the corresponding quaternary ammonium hydroxide form by treating the anion exchange resin with a dilute alkali, such as a 5% solution of sodium hydroxide.

The present invention also comprises the novel process for removing anions from an aqueous solution, which comprises contacting the solution with the novel anion exchange resins of the invention. The novel anion exchange resins are present in sufficient quantity to remove substantially all the anions from the aqueous solution. This may be done by passing the solution through a column packed with the anion exchange resin. The anion may be removed from the resin and the resin thus regenerated by washing it with a dilute alkali, preferably sodium hydroxide, which alkali will form a soluble salt with the adsorbed anions.

In order to disclose more clearly the nature of the present invention, specific examples illustrating the preparation of typical products will hereinafter be described. This is done solely by way of example, and is intended neither to delineate the scope of the invention nor limit the ambit of the appended claims.

Example 1

(A) To about 500 ml. of water at 50° to 80° C. was added a solution of 150 grams of styrene and 10.5 grams of 2,4-divinyl pyridine and 1.1 grams of benzoyl peroxide. The mixture was agitated and heated for ten hours at 50° to 80° C. when polymerization was completed. The beads of resin that formed were filtered, washed with water and dried at 110° to 130° C.

(B) 100 grams of the dried polymer obtained in part A were suspended in 310 grams of propylene dichloride. 100 grams of methyl monochloromethylether were added followed by 58 grams of anhydrous aluminum chloride added over a period of one hour. The mixture was stirred at 15° to 30° C. for an additional four hours. The suspension was quenched in ice water, the insoluble beads filtered and washed with water.

(C) The chloromethylated beads obtained in part B were suspended in 175 grams of water and then 250 grams of a 25% solution of trimethylamine were added over two hours. The mixture was then stirred for an additional four hours at 25° C. The mixture was then neutralized with sulfuric acid and the propylene dichloride distilled off at 90° C. The beads were then filtered and washed with water. The material had an ultimate capacity of 3.7 meq./gram.

Example 2

Approximately 100 grams of the polymer obtained as in Example 1 (part A) were chloromethylated in a similar manner to that described in Example 1 (part B). The resulting chloromethylated beads were suspended in 250 grams of water and 160 grams of a 70% solution of dimethylethanolamine in water was added. The mixture was stirred for five hours at 50° C. The mixture was then neutralized with sulfuric acid and propylene chloride distilled off at 90° C. The beads were then filtered and washed with water. The resulting product had an ultimate capacity of 3.8 meq./gram.

Example 3

(A) To about 600 ml. of water heated to 60° C. was added a mixture of 188 grams of 2-methyl-5-vinyl pyridine, 12 grams of 2,4-divinyl pyridine and 1.2 grams of benzoyl peroxide. The mixture was heated for five hours with stirring at 50° to 80° C. at which time the polymerization was complete. The resulting product was washed with water and dried at 110° to 130° C. for five hours.

(B) Approximately 32 grams of the resulting copolymer obtained in part A were suspended in a mixture of 50 ml. acetic anhydride and 150 grams of sodium acetate and 600 ml. of glacial acetic acid. The mixture was heated to 80° C. with stirring and 27 grams of chlorine gas were passed into the mixture over a period of three hours. During chlorination the reaction mixture was irradiated with ultra-violet light. The chlorinated copolymer was removed by filtration and washed with water. After being washed with sodium hydroxide and re-washed with water and drying, the product was found to contain about 10.5% chlorine.

(C) About 25 grams of resulting chlorinated copolymer obtained in part B were suspended in 75 ml. of water and 65 grams of a 70% aqueous solution of dimethylethanolamine were added. The suspension was heated at 70° C. for six hours. About 35 grams of the above aminated copolymer were covered with methanol to form a slurry and 40 grams of methyl iodide added. The mixture was heated at 35° C. for six hours with stirring. The resulting product was washed with methanol and air-dried and was found to have an ultimate capacity of 4.9 meq./gram.

Example 4

Approximately 30 grams of a chlorinated copolymer prepared as in Example 3 (part B) were suspended in 35 ml. of water and 100 grams of a 25% solution of trimethylamine were added. The mixture was stirred and heated at 30° C. for six hours. The resulting tertiary amine derivative was then covered with methanol to form a slurry and 90 grams of methyl iodide were added. The mixture was heated with stirring at 35° C. for six hours. The resulting quaternary ammonium derivative had an ultimate capacity of 5.3 meq./gram.

The divinyl substituted, ring-containing nitrogen heterocyclic compounds used as cross-linker compounds in preparing the copolymer resins of the invention may be prepared by a number of methods known to chemists familiar with the chemistry of vinyl compounds. One method which may be used may be illustrated with respect to the preparation of 2,4-divinyl pyridine. This method involves the condensation of 2,4-dimethyl pyridine with formaldehyde to produce the corresponding 2,4-diethanol pyridine. This product is then distilled over an alkali, such as potassium hydroxide, to remove excess formaldehyde, unreacted dimethyl pyridine and the water formed from the conversion of the ethanol groups to vinyl groups. The resulting product is essentially 2,4-divinyl pyridine. If other dimethyl pyridines or trimethyl pyridines are employed as starting materials, the corresponding divinyl pyridines may be obtained by this procedure. Where the dimethyl pyridines are commercially available as isomeric mixtures, with the methyl groups in isomeric relationship to one another, the employment of the isomeric mixture will result in the production of the corresponding divinyl isomers.

The term "ultimate capacity" used in the examples and elsewhere in the specification is determined by placing 40 ml. of resin, which has first been placed in the chloride form by passing an excess solution of dilute hydrochloric acid over the resin followed by washing with water, in a column of 16 mm. size and through this column is passed 1000 ml. of 0.75 normal sodium hydroxide at the rate of 5 ml./min. The resin bed is then washed free of phenolphthalein alkalinity with distilled water. Next 800 ml. of 0.25 normal hydrochloric sulfuric acid solution (a ratio of 1.5 parts of hydrochloric to 2.5 parts of sulfuric) is passed through the resin bed at a flow of 10 ml./min. Next 700 ml. of distilled water is passed through the tube. The effluent is collected and mixed and an aliquot is titrated to determine the residual acid. From this, the total amount of acid absorbed may be computed in terms of meq./gram of calcium carbonate which gives the total or ultimate capacity of the resin.

It is desirable that for use as anion exchange resins, the quaternary ammonium derivatives of the copolymers of the invention be converted to the corresponding quaternary ammonium hydroxide derivatives. This result is accomplished by passing a dilute aqueous solution of an alkali, such as sodium hydroxide, over the quaternary ammonium derivative of the copolymer.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. An anion exchange resin which comprises a copolymer resin of between about 60% and 99.9% on a molar basis of a monovinyl aromatic compound selected from the class consisting of a monovinyl aromatic hydrocarbon and a monovinyl ring containing nitrogen aromatic heterocyclic compound crosslinked with between about 40% and 0.1% on a molar basis of a divinyl ring-containing nitrogen aromatic heterocyclic crosslinking comonomer selected from the class consisting of a divinyl pyridine, divinyl pyrrol, divinyl quinoline and divinyl isoquinoline, in which said copolymer resin contains amino lower alkylene substituent groups on the aromatic nuclei.

2. An anion exchange resin as defined by claim 1 wherein the monovinyl aromatic compound shall comprise between about 80 and 99.5% by weight and the crosslinking comonomer between about 22% and 0.5% by weight of the copolymer.

3. An anion exchange resin as defined by claim 1, wherein the monovinyl aromatic compound is an hydrocarbon.

4. An anion exchange resin as defined by claim 1, wherein the amino lower-alkylene substituents are quaternary ammonium lower-alkylene substituents.

5. An anion exchange resin as defined by claim 3, wherein the amino lower-alkylene substituents are quaternary ammonium lower-alkylene substituents.

6. An anion exchange resin as defined by claim 1, wherein the aromatic heterocyclic crosslinker is a divinyl pyridine.

7. An anion exchange resin as defined by claim 3, wherein the aromatic heterocyclic crosslinker is a divinyl pyridine.

8. An anion exchanger resin which comprises a copolymer resin comprising between about 60% and 99.9% on a molar basis of styrene crosslinked with between about 40% and 0.1% on a molar basis of a divinyl pyridine, in which said copolymer resin contains amino lower-alkylene substituent groups on the aromatic nuclei.

9. An anion exchange resin as defined by claim 8, wherein the amino lower-alkylene substituent groups are trimethyl quaternary ammonium methylene groups.

10. An anion exchange resin as defined by claim 8, wherein the amino lower-alkylene substituent groups are dimethyl-ethanol quarternary ammonium methylene groups.

11. An anion exchange resin which comprises a copolymer resin comprising between about 60% and 99.9% on a molar basis of 2-methyl-5-vinyl pyridine crosslinked with between about 40% and 0.1% on a motar basis of a divinyl pyridine, in which said copolymer resin contains amino lower-alkylene substituent groups on the aromatic nuclei.

12. An anion exchange resin as defined by claim 11, in which the amino lower-alkylene groups are trimethylethanol quaternary ammonium-methylene groups.

13. An anion exchange resin as defined by claim 11, wherein the amino lower-alkylene groups are tetramethyl quaternary ammonium-methylene groups.

14. The process of producing an anion exchange resin as defined by claim 1, comprising condensing the copolymer resin with a lower aliphatic aldehyde containing not more than 3 carbon atoms and a member selected from the class consisting of ammonia, primary and secondary amines.

15. The process of producing an anion exchange resin as defined by claim 1, comprising treating the nuclear haloalkylated copolymer resin with an amine.

16. The process of producing an anion exchange resin as defined by claim 1, comprising treating a haloalkyl derivative of the copolymer resin in which the haloalkyl substituent groups are nuclearly substituted on the aromatic nuclei with a member selected from the class consisting of ammonia and an amine.

17. A method of removing anions from solutions which comprises bringing such solutions into contact with the anion exchange resin of claim 1.

18. A method of removing anions from solutions which comprises bringing such solutions into contact with the anion exchange resin of claim 3.

References Cited in the file of this patent

UNITED STATES PATENTS

| | | |
|---|---|---|
| 2,503,209 | Nyquist | Apr. 4, 1950 |
| 2,534,285 | Mahan | Dec. 19, 1950 |
| 2,540,984 | Jackson | Feb. 6, 1951 |
| 2,540,985 | Jackson | Feb. 6, 1951 |
| 2,591,573 | McBurney | Apr. 1, 1952 |
| 2,623,013 | D'Alelio | Dec. 23, 1952 |
| 2,632,001 | McMaster et al. | Mar. 17, 1953 |
| 2,687,382 | Butler et al. | Aug. 24, 1954 |
| 2,688,009 | Crouch et al. | Aug. 31, 1954 |
| 2,739,948 | D'Alelio | Mar. 27, 1956 |

FOREIGN PATENTS

| | | |
|---|---|---|
| 755,773 | Great Britain | Aug. 29, 1956 |

OTHER REFERENCES

The Van Vostrand Chemist's Dictionary, New York 1953, p. 44.

U. S. DEPARTMENT OF COMMERCE
PATENT OFFICE
CERTIFICATE OF CORRECTION

Patent No. 2,824,844                                                          February 25, 1958

Martin E. Gilwood

It is hereby certified that error appears in the printed specification of the above numbered patent requiring correction and that the said Letters Patent should read as corrected below.

Column 2, line 40, for "anthacene" read -- anthracene --; column 7, line 24, for "hetteocyclic" read -- heterocyclic --; column 9, line 67, for "22%" read -- 20% --; column 10, line 9, for "exchanger" read -- exchange --; line 25, for "motar" read -- molar --.

Signed and sealed this 22nd day of April 1958.

(SEAL)
Attest:

KARL H. AXLINE                                              ROBERT C. WATSON
Attesting Officer                                         Commissioner of Patents